US008543064B2

(12) United States Patent
Pedersen et al.

(10) Patent No.: US 8,543,064 B2
(45) Date of Patent: Sep. 24, 2013

(54) ENHANCED ESTIMATION OF UPLINK INTERFERENCE COUPLING

(75) Inventors: Klaus I. Pedersen, Aalborg (DK); Istvan Z. Kovacs, Aalborg (DK); Luis Garcia, Aalborg (DK)

(73) Assignee: Nokia Siemens Networks Oy, Espoo (FI)

( * ) Notice: Subject to any disclaimer, the term of this patent is extended or adjusted under 35 U.S.C. 154(b) by 450 days.

(21) Appl. No.: 13/036,464

(22) Filed: Feb. 28, 2011

(65) Prior Publication Data

US 2011/0212739 A1 Sep. 1, 2011

Related U.S. Application Data

(60) Provisional application No. 61/309,044, filed on Mar. 1, 2010.

(51) Int. Cl.
*H04B 1/00* (2006.01)

(52) U.S. Cl.
USPC .......................................... 455/63.1; 455/501

(58) Field of Classification Search
USPC ....................................... 455/63.1
See application file for complete search history.

(56) References Cited

U.S. PATENT DOCUMENTS

| 2011/0081934 A1* | 4/2011 | Imamura et al. | 455/522 |
| 2011/0098054 A1* | 4/2011 | Gorokhov et al. | 455/452.1 |
| 2011/0199985 A1* | 8/2011 | Cai et al. | 370/329 |

FOREIGN PATENT DOCUMENTS

| WO | WO 2010/136073 | 12/2010 |

OTHER PUBLICATIONS

3GPP TS 36.300 V8.6.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stale 2 (Release 8)", Sep. 2008, 137 pages.

"Autonomous Component Carrier Selection for Local Area Uncoordinated Deployment of LTE-Advanced", Luis G. U. Garcia et al., IEEE Proc VTC, Fall 2009, 5 pgs.

"Autonomous Component Carrier Selection: Interference Management in Local Area Environments for LTE-Advanced", Luis G. U. Garcia et al., IEEE Communications Magazine, Sep. 2009, 7 pgs.

"Use of Background Interference Matrix for Autonomous Component Carrier Selection for LTE-Advanced", Nokia Siemens Networks, 3GPP TSG RAN WG1 #55-bis Meeting, R1-090235, Jan. 2009, 7 pgs.

"Autonomous CC selection results for dense urban area", Nokia Siemens Networks, 3GPP TSG RAN WG1 #58 Meeting, R1-093321, Aug. 2009, 6 pgs.

(Continued)

*Primary Examiner* — Fayyaz Alam
*Assistant Examiner* — David Bilodeau
(74) *Attorney, Agent, or Firm* — Harrington & Smith

(57) ABSTRACT

Uplink interference coupling is estimated between a first cell and a second cell by adjusting downlink interference coupling between the cells at least according to user equipment UE transmit power per physical resource block PRB. This estimated uplink interference coupling is used to decide whether to take a component carrier into use in the first cell. In various embodiments: the uplink interference coupling is estimated by adjusting the downlink interference coupling according to transmit power per PRB of a first UE in the first cell and transmit power per PRB of a second UE in the second cell; and by further adjusting the downlink interference coupling according to path losses of the first and second UEs; and the transmit power per PRB as well as the path loss of the second UE is determined from signaling received in the first cell from the second UE operating in the second cell.

20 Claims, 4 Drawing Sheets

(56) References Cited

OTHER PUBLICATIONS

"Autonomous CC selection for heterogeneous environments", Nokia Siemens Networks, 3GPP TSG RAN WG1 #59 Meeting, R1-094659, Nov. 2009, 4 pgs.

Ellenbeck, et al., "Performance of Decentralized Interference Coordination in the LTE Uplink", (2009), (5 pages).

3GPP TSG WG1 Meeting #60, NTT Docomo, "Downlink Interference Coordination Between eNodeB and Home eNodeB", R1-101225, (8 pages).

* cited by examiner

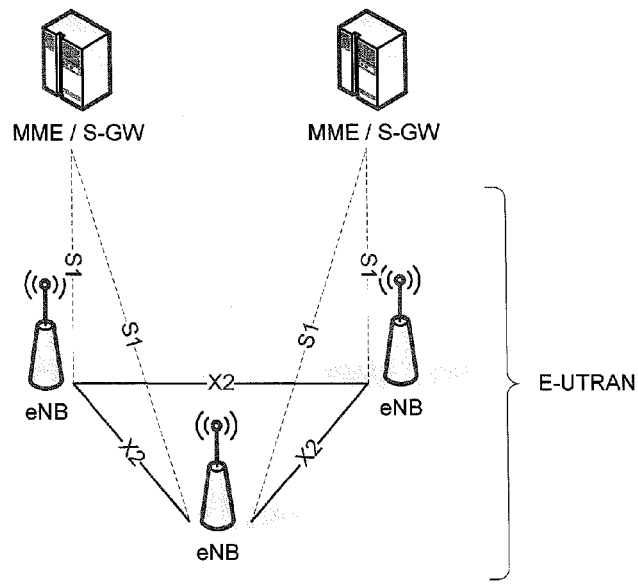
Figure 1A: Prior Art
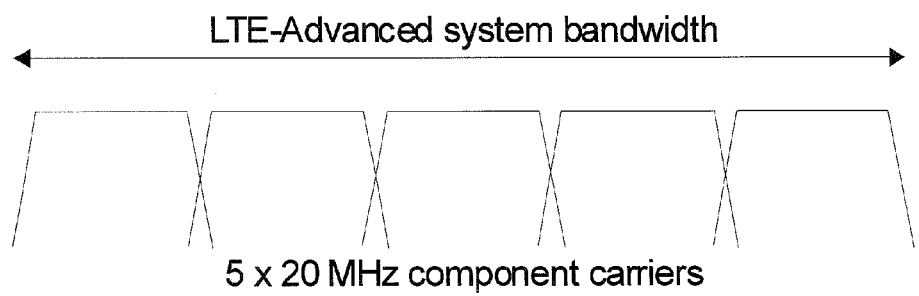
Figure 1B: Prior Art $PSD_{Int\_other\_largest\_PL}\{n\} = PSD_{Int\_other}\{n\} - \alpha(PL_{other\_largest\_PL}\{n\} - PL_{other}\{n\})$

US 8,543,064 B2

ENHANCED ESTIMATION OF UPLINK INTERFERENCE COUPLING

CROSS REFERENCE TO RELATED APPLICATION

This application claims benefit under 35 USC 119(e) to U.S. Provisional Application No. 61/309,044, filed Mar. 1, 2010.

TECHNICAL FIELD

The exemplary and non-limiting embodiments of this invention relate generally to wireless communication systems, methods, devices and computer programs and, more specifically, relate to carrier selection in a multi-carrier or carrier aggregation system.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
ACCS autonomous component carrier selection
BIM background interference matrix
CA carrier aggregation
CC component carrier
C/I carrier interference ratio
DL downlink (eNB to UE)
eNB E-UTRAN Node B (evolved Node B/base station)
E-UTRAN evolved UTRAN (LTE)
IMT international mobile telecommunications
ITU-R international telecommunication union-radio
LTE long term evolution
LTE-A LTE advanced
MM/MME mobility management/mobility management entity
OLPC open loop power control
PC power control
PDCCH physical downlink control channel
PRB physical resource block
PSD power spectral density (dBm/Hz)
RRC radio resource control
RRAT radio resource allocation table
SINR signal to interference plus noise ratio
UE user equipment
UL uplink (UE to eNB)
UTRAN universal terrestrial radio access network In the communication system known as evolved UTRAN (E-UTRAN, also referred to as UTRAN-LTE, E-UTRA), the LTE Release 8 is completed, the LTE Release 9 is being standardized, and the LTE Release 10 is currently under development within the 3GPP. In LTE the downlink access technique is orthogonal frequency division multiple access OFDMA, and the uplink access technique is single carrier frequency division multiple access SC-FDMA. These access techniques are expected to continue in LTE Release 10.

FIG. 1 reproduces FIG. 4.1 of 3GPP TS 36.300, V8.6.0 (2008-09), and shows the overall architecture of the E-UTRAN system. The EUTRAN system includes eNBs, providing the EUTRA user plane and control plane (RRC) protocol terminations towards the UE. The eNBs are interconnected with each other by means of an X2 interface. The eNBs are also connected by means of an S1 interface to an evolved packet core, more specifically to a MME and to a Serving Gateway. The S1 interface supports a many to many relationship between MMES/Serving Gateways and the eNBs.

Of particular interest herein are the further releases of 3GPP LTE targeted towards future IMT-Advanced systems, referred to herein for convenience simply as LTE-Advanced (LTE-A). LTE-A is directed toward extending and optimizing the 3GPP LTE Release 8 radio access technologies to provide higher data rates at very low cost. LTE-A will most likely be part of LTE Release 10. LTE-A is expected to use a mix of local area and wide area optimization techniques to fulfill the ITU-R requirements for IMT-Advanced while keeping the backward compatibility with LTE Release 8.

There is a bandwidth extension beyond 20 MHz in LTE-Advanced which is to be done via carrier aggregation (CA). This is shown conceptually at FIG. 1B in which there are five CCs aggregated to form one larger LTE-Advanced bandwidth of 100 MHz. Each CC has DL and UL resources for enabling increased data rates such as for example by simultaneously scheduling an active UE across multiple CCs to better distribute traffic.

In general for the LTE-A CA concept, at least one of the CCs is a stand-alone CC and so is backwards compatible with 3GPP Release 8 UEs. LTE-A terminals can receive or transmit simultaneously on multiple aggregated CCs. Each CC in the overall bandwidth may be a Release 8 compatible stand alone CC, or some may be stand alone but not Release 8 compatible (e.g., violating the LTE Release 8 fixed duplex gap), and further some may be extension carriers which cannot exist stand-alone and which are tied to a stand-alone CC. While the example at FIG. 1B illustrates 5 CCs of 20 MHz each spanning a total contiguous bandwidth of 100 MHz, other embodiments of CA may have non-contiguous CCs and/or CCs which do not even belong the same frequency band (for example the spectrum blocks might even be far apart in terms of frequency such as 700 MHz and 2.1 GHz). Other CA embodiments may have an asymmetric DL/UL CA which for example may be built by combining a frequency division duplex FDD carrier with a time division duplex TDD carrier. LTE-A is an exemplary but not the only CA-type system.

Another aspect being developed in LTE-A is the concept of heterogeneous networking, or HetNet for short. Adjacent cells cooperate to achieve more efficient use of scarce radio resources even if they are different wireless systems. For example, there may be femto-cells, sometimes termed home base stations or other networks of one cell or very limited geographic area, existing side by side with other femto-cells and with traditional network-operated cellular base stations/eNBs. These cells may cooperate to mitigate interference with one another, or at least positively limit their own interference to adjacent cells to avoid the greedy cell scenario in which one cell occupies more bandwidth resources than its traffic justifies, at the expense of an adjacent cell.

ACCS is one of the CA interference management schemes that is proposed for LTE-A. The following published documents give some background on ACCS; particularly as it relates to LTE-A, and are attached to the above-referenced priority US provisional application as respective Exhibits A through E.

L. Garcia, K. I. Pedersen, P. E. Mogensen, "AUTONOMOUS COMPONENT CARRIER SELECTION: INTERFERENCE MANAGEMENT IN LOCAL AREA ENVIRONMENTS FOR LTE-ADVANCED", IEEE Communications Magazine, September 2009.

R1-093321, "AUTONOMOUS CC SELECTION RESULTS FOR DENSE URBAN AREA"

R1-094659, "AUTONOMOUS CC SELECTION FOR HETEROGENEOUS ENVIRONMENTS"

R1-090235, USE OF BACKGROUND INTERFERENCE MATRIX FOR AUTONOMOUS COMPONENT CARRIER SELECTION FOR LTE-ADVANCED.

L. Garcia, K. I. Pedersen, P. E. Mogensen, "AUTONOMOUS COMPONENT CARRIER SELECTION FOR LOCAL AREA UNCOORDINATED DEPLOYMENT OF LTE-ADVANCED", accepted for publication in IEEE Proc VTC 2009-Fall.

As described in the above references, the ACCS concept relies on collection of the so-called background interference matrix (BIM) at each base station. The BIM is used by the base stations to determine if it is allowed to take additional component carriers (CCs) into use without causing too low performance/too much interference in the surrounding cells using the same CC. The BIM can also be used to ensure that the performance in the host cell is acceptable. Most of the previous ACCS studies have focused on the downlink BIM and assume that the uplink BIM is sufficiently close to the downlink BIM that the two can be interchanged. The inventors have found that the UL BIM is regularly biased and so the DL BIM is not an accurate substitute.

SUMMARY

In accordance with a first aspect of the invention there is provided an apparatus comprising a memory storing a program of computer instructions and at least one processor. In this embodiment the memory and the program of computer instructions is configured with the at least one processor to cause the apparatus to at least: estimate uplink interference coupling between a first cell and a second cell by adjusting downlink interference coupling between the first and second cells at least according to user equipment transmit power per physical resource block; and decide whether to take a component carrier into use in the first cell based at least partly on the estimated uplink interference coupling.

In accordance with a second aspect of the invention there is provided a method comprising: estimating uplink interference coupling between a first cell and a second cell by adjusting downlink interference coupling between the first and second cells at least according to user equipment transmit power per physical resource block; and deciding whether to take a component carrier into use in the first cell based at least partly on the estimated uplink interference coupling.

In accordance with a third aspect of the invention there is provided a memory storing a program of computer instructions that when executed by a processor result in actions directed toward evaluating a component carrier for use. In this embodiment the actions comprise: estimating uplink interference coupling between a first cell and a second cell by adjusting downlink interference coupling between the first and second cells at least according to user equipment transmit power per physical resource block; and deciding whether to take a component carrier into use in the first cell based at least partly on the estimated uplink interference coupling.

BRIEF DESCRIPTION OF THE DRAWINGS

FIG. 1A reproduces FIG. 4 of 3GPP TS 36.300, and shows the overall architecture of the E-UTRAN system.

FIG. 1B is a schematic diagram of a carrier aggregation of five component carriers into a single LTE-Advanced bandwidth, which represents an exemplary environment in which these teachings can be used to advantage.

DETAILED DESCRIPTION

Figure 2:
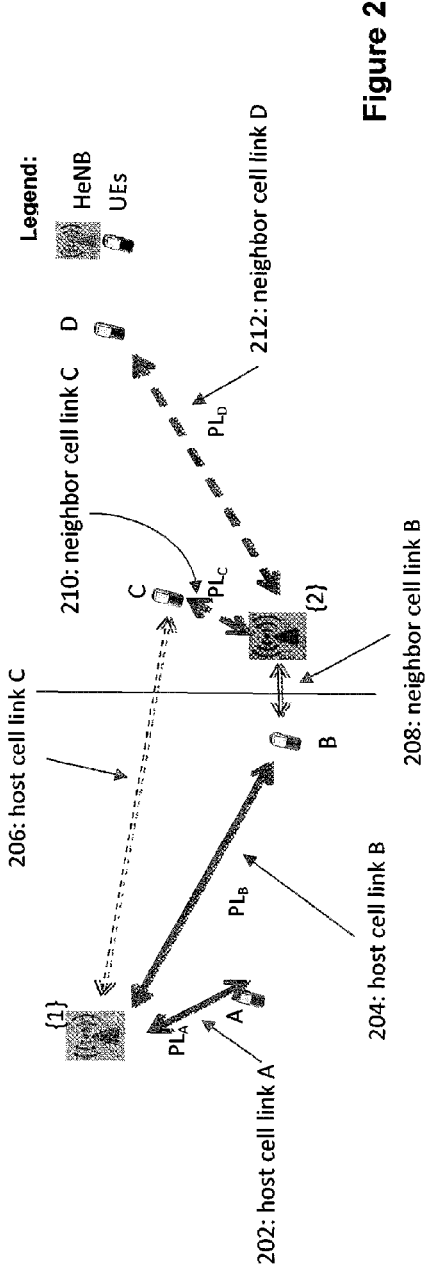
FIG. 2 is a schematic diagram of two adjacent heterogeneous cells and links to various user equipments which are used to estimate uplink interference coupling between the two cells according to an exemplary embodiment of the invention.

In accordance with an exemplary embodiment of the invention there is a simple, yet efficient, method for mapping the BIM collected from downlink UE measurements into an equivalent uplink BIM. It is known and specifically described in the above cited references that the BIM is obtained from UE measurements of the reference signal received power (RSRP) from different base stations. Assuming that both base stations transmit with the same power spectral density (PSD) i.e. the same power per Physical Resource Block (PRB), the RSRP difference (in dB) simply corresponds to the path loss difference from one UE to two different base stations and expresses the so-called conditional interference ratio. The BIM combined with knowledge of the transmit power at the base stations—which is typically assumed to be the same—can be used to directly estimate what the SINR will equal in both the host and any given surrounding cell if a base station takes a new CC into use. In the ACCS there is a primary CC which is always active in the cell, and one or more secondary CCs which may be taken into use when traffic requires additional radio resources. Interference occurs when a secondary CC that one cell takes into use is either the primary CC of an adjacent cell or a secondary CC of the adjacent cell which the adjacent cell has already taken into use.

In the uplink interference scenario the UEs are typically transmitting with different power spectral densities since they are using transmit power control (PC). The inventors have found that because of this per-UE power disparity the uplink interference scenario cannot be assumed to be fully equivalent to the downlink interference scenario in which the adjacent base stations typically transmit to all UEs with the same transmit power. For an improved estimation of the uplink SINR which would result in different cells if a base station takes a new CC use, an exemplary embodiment of this invention takes the UEs transmit power settings—essentially the PSD—into account when determining the uplink interference coupling or uplink BIM. It is important to consider power spectral densities instead of actual transmit power levels for the latter depends on the number of PRBs allocated to any given UE, whereas the former does not. This exemplary embodiment also takes into account the path loss measurements from the UEs which is the basis for the DL BIM. Briefly, an embodiment of the invention estimates an equivalent UL BIM by combining the DL BIM with knowledge of the transmit power settings of various UEs.

One technical effect of this exemplary embodiment is that it provides an improved estimation of the incoming and outgoing UL BIMs by relying on UE transmit power based correction factors which are applied to the existing DL BIMs. Another technical effect is that the improved UL BIM estimates may be used to facilitate/enable UE-specific secondary component carrier selection (that is, decisions on taking a CC into use may be made on a UE-specific basis within a cell).

Exemplary embodiments of the invention provide a distributed and scalable rule for inference of conditional UL C/I ratios (either or both of incoming and outgoing C/I ratios) based on power reduction and path loss differences. The two cells for which the interference ratios are calculated need to exchange information for that purpose only infrequently, such as for example by means of broadcast Radio Resource Allocation Table (RRAT) messages which are already included in the ACCS concept. As will be shown, the estimated UL BIMs according to the exemplary embodiments detailed below enable selection or re-selection of a secondary CC on a UE-specific basis, thus making UL and DL component carrier allocation independent of each other. As will be shown, embodiments of this invention can achieve a CC re-use of one when CC allocation is implemented on a UE-specific basis using the uplink interference coupling techniques described herein.

Note that while the examples assume the CA system is according to LTE-A as that system is currently developed, these teachings are not limited only to that example system but can be employed in any CA system in which at least one of the CCs can be taken into use or not by one cell based on considerations of interference to another cell.

Details as to determining the DL BIM may be seen in the prior art, such as for example in the references noted in the background section above, and are not further detailed herein. The examples below show computation of the incoming UL BIM and the outgoing UL BIM. Incoming UL BIM means interference of a host cell's UL on a CC (that may be taken into use by the host cell) from a neighbor cell's UL, and outgoing UL BIM means interference by the host cell's UL on a CC (that may be taken into use by the host cell) to a neighbor cell's UL. The term host cell simply refers to the cell which is computing/estimating the UL BIMs that represent its own interference to and from the neighbor cell. In the example at FIG. 2 the host cell is designated as $\{1\}$; the neighbor cell is designated as $\{2\}$; the notation for incoming interference is the subscript $\{1\}4\leftarrow\{2\}$; and the notation for outgoing interference is the subscript $\{1\}\leftarrow\{2\}$. While the examples are in the context of determining the UL BIM from the DL BIM, more generally it is the uplink interference coupling that is determined according to these teachings, not necessarily limited to only a background matrix. Estimating the UL interference coupling according to the exemplary embodiments below requires information about UEs in the host cell and about UEs in the neighboring cell. While the description uses the term base station or eNB for the node controlling radio resources in the cell, other types of systems and networks might use a different term for that access node.

The host base station needs to know the path loss towards its served UEs as well as their respective transmit PSD (power per PRB). The host base station/eNB can easily know the served UE transmit PSD if the open loop power control (OLPC) is used, as the eNB then can calculate the UEs transmit PSD based on path loss measurements and knowledge of the OLPC parameter settings. For closed loop power control systems the served UE may need to signal its transmit power settings to the host base station/eNB. In an embodiment the host base station/eNB can also rely on so-called power headroom reports from the UE to estimate its transmit PSD.

FIG. 2 is an example wireless environment in which embodiments of the invention may be used to advantage and shows two adjacent heterogeneous cells, heterogeneous eNB (or HeNB) $\{1\}$ and HeNB $\{2\}$, for which the UL interference coupling is computed according to an exemplary embodiment of the invention. FIG. 2 also shows various links to four user equipments UEs designed [A] through [D]. As illustrated at FIG. 2, UEs [A] and [B] are served by the host eNB $\{1\}$ and UEs [C] and [D] are served by the neighbor cell $\{2\}$.

In the notation of FIG. 2, the solid lines (links 204, and 208) show the radio links involved in the determination of the DL incoming BIM, hereafter denoted as $DL_{\{1\}\leftarrow\{2\}}$. The dashed lines (links 206 and 210) show the radio links involved in the determination of the DL outgoing BIM of cell $\{1\}$, denoted as $DL_{\{1\}\rightarrow\{2\}}$. The heavy lines (solid or dashed, links 202, 204, 210 and 212) represent the carrier signal while the narrow lines (solid or dashed, links 206 and 208) represent the pertinent interference paths.

For both $DL_{\{1\}\leftarrow\{2\}}$ and $DL_{\{1\}\rightarrow\{2\}}$, the measurements from the UE experiencing/causing the lowest conditional C/I value are assumed to be the ones that dictate the incoming/outgoing BIM entry values. This was the case for some previous ACCS studies in local area deployments. In FIG. 2, this corresponds to UEs B ($DL_{\{1\}\leftarrow\{2\}}$) and C ($DL_{\{1\}\rightarrow\{2\}}$).

Currently ACCS assumes that $UL_{\{1\}\leftarrow\{2\}}\approx DL_{\{1\}\rightarrow\{2\}}$ and $UL_{\{1\}\rightarrow\{2\}}\approx DL_{\{1\}\leftarrow\{2\}}$, that the UL incoming ($\{1\}\leftarrow\{2\}$) carrier to interference ratio is approximately the same as the DL outgoing ($\{1\}\rightarrow\{2\}$) carrier to interference ratio and similarly for the UL outgoing ($\{1\}\rightarrow\{2\}$) and DL incoming ($\{1\}\leftarrow\{2\}$) ratios. This assumption follows from the interference paths (narrow line arrows) being the same, just in the opposite direction.

This means that in current ACCS formulations the $UL_{\{1\}\leftarrow\{2\}}$ BIM is estimated using links 206 and 210; while the $UL_{\{1\}\rightarrow\{2\}}$ BIM is computed using links 204 and 208. Clearly, the desired signal parts (links 202 and 204) are ignored when computing the $UL_{\{1\}\leftarrow\{2\}}$ BIM, and the desired signal parts (links 210 and 212) are ignored when computing the $UL_{\{1\}\rightarrow\{2\}}$ BIM. Therefore the approximation is only valid if the path losses are similar (for example, if the path loss $PL_A$ from UE [A] to HeNB $\{1\}$ on link 202 is similar to the path loss $PL_C$ of UE [C] to its serving HeNB $\{2\}$ on link 210).

This assumption becomes less valid, and the estimation becomes less accurate, for the conditional UL incoming ratio for UE [B] at FIG. 2 whose distance/channel conditions between it and its serving HeNB $\{1\}$ are quite different from that for UE [C]. In this case, the path loss $PL_B$ from UE [B] to its serving HeNB $\{1\}$ is greater than the path loss $PL_C$ from UE [C] to its serving HeNB $\{2\}$. Using the assumption above when the path losses are not approximately equal as is the case for UEs [B] and [C] leads to optimistically biased values. Additionally, if UEs are using transmit power control PC, they will transmit at different power levels, rendering the above traditional estimation for ACCS very inaccurate.

Exemplary embodiments of the invention address the above biasing problem. For simplicity of explanation we assume there are only the four UEs shown at FIG. 2, understanding that the examples below can be extended to incorporate power reduction adjustments and path loss adjustments for additional UEs in the host and/or neighbour cells.

According to an exemplary embodiment of the invention and with reference to FIG. 2, the UL BIM between a first cell HeNB {1} and a second cell HeNB {2} is estimated by adjusting downlink interference coupling (adjusting the DL BIM) between the first and second cells according to transmit PSD reduction with respect to a common maximal PSD of a first UE operating in the first cell and according to transmit PSD reduction of a second UE operating in the second cell, and further adjusted according to difference of path losses of the first UE and the second UE. For the case the UL BIM is incoming, the first UE is UE [A] and the second UE is UE [C] of FIG. 2. For the case in which the UL BIM is outgoing, the first UE is UE [B] and the second UE is UE [D] of FIG. 2.

In an exemplary embodiment the UL BIMs are estimated according to rules/equations 1 and 2 below:

$$UL_{\{1\}\leftarrow\{2\}} \approx DL_{\{1\}\rightarrow\{2\}} - PSD_{Interfered\_own\_largest\_PL}(B) + PSD_{Interferer\_other}(C) - \Delta(PL_B, PL_C) \qquad 1.$$

$$UL_{\{1\}\rightarrow\{2\}} \approx DL_{\{1\}\leftarrow\{2\}} + PSD_{Interferer}(B) - PSD_{Interfered\_other\_largest\_PL}(D) + \Delta(PL_B, PL_D). \qquad 2.$$

Once the UL BIM is estimated (or more generally once the UL interference coupling is estimated), a decision on whether to take a CC into use in the first cell is based at least partly on that estimated UL BIM. In an embodiment the decision is based on both an estimated incoming UL BIM and estimated outgoing UL BIM. The decision may be a simple threshold against which the UL BIM's are compared; if the estimated UL BIMs show that interference would not exceed that pre-determined threshold then the CC on which the UL BIMs were computed may be taken into use in the host cell HeNB {1}.

While the examples concern estimating one incoming UL BIM and one outgoing UL BIM in view of a single neighbor cell, in an embodiment the same described process is performed for each of a plurality of adjacent neighbor cells which are using a particular CC, and only if the estimated incoming and outgoing UL interferences are within an acceptable range does the host HeNB decide to take that CC into use in its cell. The host HeNB can recalculate for multiple CCs individually until it finds one CC for which the UL interferences are acceptably low.

Notice that it is not necessary to exchange the UL incoming BIMs to be used as the corresponding outgoing BIMs in the neighbor cell HeNB {2}, as they are estimated locally in the host cell HeNB {1} based on previously exchanged information as detailed further below.

In equation (1), the first PSD reduction to be considered by the host HeNB {1} $PSD_{Interferend\_own\_largest\_PL}$ ($UE_k$)) shall be the one of its served UEs with the largest path loss towards it, max($PL_k$) which in the FIG. 2 example is UE [B]. The PSD reduction is defined in this exemplary example as the difference in dB between the maximum allowed transmission power level per PRB, i.e. PSD and current UE transmit power spectral density.

The second PSD reduction in equation (1) is that of UE [C], which in an embodiment is signaled by cell {2} to cell {1} since it is not known otherwise by cell {1}. This is the reduction applied to the UE responsible for the host cell's (HeNB {1}), $DL_{\{1\}\rightarrow\{2\}}$, which is also the neighbor cell's (HeNB {2}) $DL_{\{1\}\leftarrow\{2\}}$. The last term in equations (1) and (2) accounts for the path loss difference towards the respective serving cells of the served UE used in the first power reduction term (largest path loss to {1} which is $PL_B$) and that of UE [C] used in the second power reduction term (other path loss to {2} which is $PL_C$).

The first PSD reduction term of equation (2) is that of the UE which is responsible for the host cell's (HeNB {1}) $DL_{\{1\}\leftarrow\{2\}}$. In this case it is the same UE [B], but it does not necessarily need to be the same UE as was used in the first power reduction term of equation (1). The second PSD reduction term of equation (2) is analogous to the first PSD reduction term of equation (1), in that it represents the PSD reduction applied to the UE with the largest path loss towards its serving cell (HeNB {2}) which in this case is UE [D]. This value is also signaled between the two cells. Finally, the last term of equation (2) accounts for the path loss difference towards the respective serving cells of the served UE used in the first PSD reduction term ($DL_{\{1\}\leftarrow\{2\}}$, which in this instance is UE[B]) and that of UE used in the second PSD reduction term (which in this instance is UE [D]).

Figure 3:
FIG. 3 is a diagram illustrating how a power value for a UE in an adjacent cell which is used in estimating the uplink interference coupling can be obtained from other known values to avoid having to signal that power value, according to an exemplary embodiment of the invention.

FIG. 3 is a graphic overview summarizing the pieces of information that in an embodiment of the invention are exchanged between host and neighbor cells so that the host cell is able to determine more accurate estimation of the UL interference conditions. Note that each of the depicted cells in FIG. 2 can be a host cell to the extent they each make their own calculation of the UL BIMs according to these teachings, in which case each is also neighbor to the others UL calculations. FIG. 3 illustrates that in principle, only three of the values rather than all four need be signaled, since the term $PSD_{Interfered\_other\_largest\_PL}$ can be inferred or estimated from the other three values. FIG. 3 assumes that the power control parameters ($P_0$, alpha, $PSD_{max}$) are the same in both cells. In LTE (and also likely for LTE-A), $P_0$ is a UE-specific parameter used to control the SNR target, alpha is the cell-specific path loss compensation factor and $PSD_{max}$ represents the maximum power that can be allocated to a single PRB, typically, equal to the maximum UE transmit power. Nonetheless, the absolute value of this common maximum PSD is irrelevant for certain exemplary embodiments of these teachings which only consider relative differences. In the absence of that assumption, then the term $PSD_{Interfered\_other\_largest\_PL}$ can be signaled from the neighbor cell {2} to the host cell {1} so the host cell can compute its $UL_{\{1\}\rightarrow\{2\}}$ according to equation (2) above.

Above it was stated that the decision to take a CC into use in a cell may be made on a per-UE basis given the UL BIM estimations presented herein. This can be done by extending the above concepts a bit to allow for UE-specific CC usage evaluations. The concept is that the HeNB is able to identify, for each of its served UEs individually (or for at least for one of its served UEs for whom additional traffic capacity might be needed), which CCs can be used given the current CC allocation of the neighboring cells. Then, it would be up to the packet scheduler within the host HeNB {1} to effectively distribute the radio resources on the new CC according to any internal metric.

As a non-limiting example to illustrate the concept of deciding whether to take a CC into use on a per-UE basis, consider that in FIG. 2 UE [A] could in principle use the same UL component carriers as UE [C], while at the same time UE [B] would not be allowed to use the same UL component carrier as UE [D]. On a cell level, this would facilitate a virtual frequency reuse one, as all component carriers may come into use in both adjacent cells, but not necessarily in use by all UEs due to concerns for excessive inter-cell UL interference.

The per-UE CC decision differs from simple UL channel aware scheduling in that, when the host HeNB {1} schedules UE [B] in the above example it can take into account the interference this allocation can generate towards existing allocations in the neighbour HeNB {2}. To do so, in an exemplary embodiment of the invention the two rules/equations above are extended as follows:

$$UL_{k \leftarrow \{n\}} \approx DL_{\{1\} \rightarrow \{n\}} - PSD_{Interfered\_other}\{n\} - \Delta(PL_{UK_k}, PL_{other}) \quad 3.$$

$$UL_{k \rightarrow \{n\}} \approx DL_{k \leftarrow \{n\}} + PSD_{Interferer\_own}(US_k) - PSD_{Interfered\_other\_largest\_PL}\{n\} + \Delta(PL_{UE_k}, PL_{other\_largest\_PL}) \quad 4.$$

Using k as an index to distinguish individual UEs and n as an index to distinguish cells/HeNBs, then $UL_{k \leftarrow \{n\}}$ represents the conditional UL incoming C/I ratio for UE k if it reuses the same component carrier that is currently being used in neighbor cell n (in this example n=2 is the source of incoming interference) and $UL_{k \rightarrow \{n\}}$ is the conditional UL outgoing C/I ratio for UE k if it reuses the same component carrier that is currently being used in cell n (cell n being the victim of interference). One distinction as between equations (3)-(4) with respect to equations (1)-(2) is the fact that k-th UE specific PSD reduction and path loss (towards the host cell) are considered in (3) and the use of $DL_{k \leftarrow \{n\}}$ in equation (4), which is the downlink incoming C/I ratio with respect to neighboring cell n as measured by UE k.

The second PSD reduction terms and the second argument in the path loss difference calculation in (3)-(4) are exactly the same as in (1)-(2) due to the fact that there is no simple way for one cell (for example the host HeNB {1}) to know whether UE [A] will be interfering with either UE [C] or UE [D] in the neighbor/other cell, since this depends entirely on the scheduling that is carried out independently by the other cell HeNB {2}. All the host cell HeNB {1} knows is that a certain component carrier is in use in the UL in other cell. Therefore, in order to ensure that the most detrimental reuse of resources does not take place, the most severe interferer/interfered UEs are still used in the estimations, i.e. UEs [C] and [D]. Furthermore, since the BIM's are not updated frequently in an embodiment of the invention time-averaging of all inputs is implicit.

Figure 4:
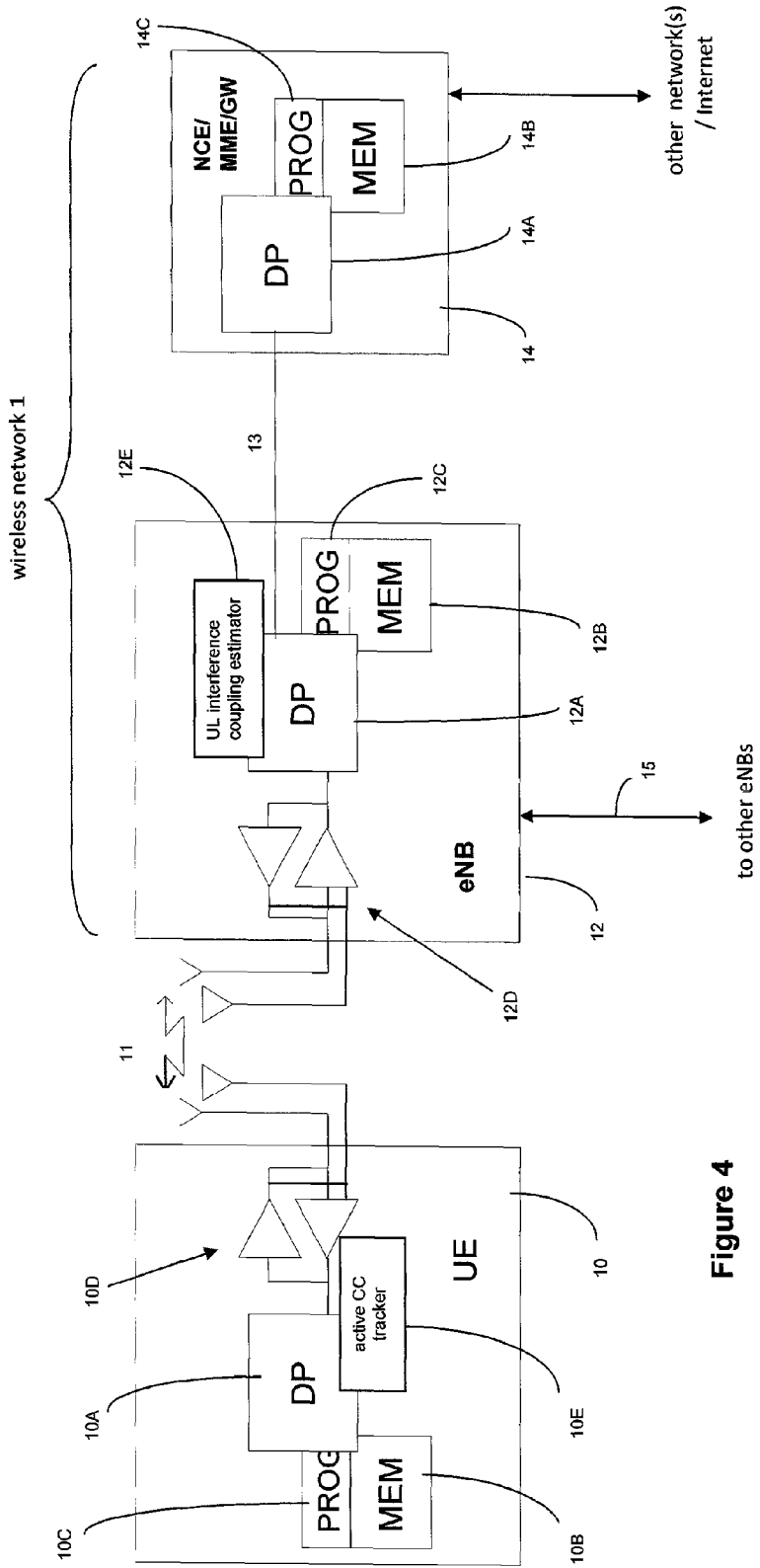
FIG. 4 shows a simplified block diagram of certain apparatus according to various exemplary embodiments of the invention.

Reference is now made to FIG. 4 for illustrating a simplified block diagram of various electronic devices and apparatus that are suitable for use in practicing the exemplary embodiments of this invention. In FIG. 4 a wireless network 1 is adapted for communication over a wireless link 11 with an apparatus, such as a mobile communication device which above is referred to as a UE 10, via a network access node, such as a Node B (base station), and more specifically an eNB 12. The network 1 may include a network control element (NCE) 14 that may include the MME/S-GW functionality shown in FIG. 1A, and which provides connectivity with a network, such as a telephone network and/or a data communications network (e.g., the internet). The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the eNB 12 via one or more antennas. The eNB 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas. The eNB 12 is coupled via a data/control path 13 to the NCE 14. The path 13 may be implemented as the S1 interface shown in FIG. 1A. The eNB 12 may also be coupled to another eNB via data/control path 15, which may be implemented as the X2 interface shown in FIG. 1A.

At least one of the PROGs 10C and 12C is assumed to include program instructions that, when executed by the associated DP, enable the device to operate in accordance with the exemplary embodiments of this invention, as will be discussed below in greater detail.

That is, the exemplary embodiments of this invention may be implemented at least in part by computer software executable by the DP 10A of the UE 10 and/or by the DP 12A of the eNB 12, or by hardware, or by a combination of software and hardware (and firmware).

For the purposes of describing the exemplary embodiments of this invention the UE 10 may be assumed to also include an active component carrier tracker 10E, and the eNB 12 may also similarly include an uplink interference coupling estimator 12E. The uplink interference coupling estimator 12E determines the incoming and outgoing UL BIM according to an embodiment of the invention, the DP 12A uses those UL BIMs to decide whether to take a CC into use in the cell or for a particular UE in the cell, and the active component carrier tracker 10E tracks for the UE which CCs are in use for it in the cell and which it must monitor for control signaling (for example a PDCCH) from the eNB 12. In certain embodiments the functions of the estimator 12E and the tracker 10E may be performed by the DP 12A/10A of the respective device 12/10, but are shown as distinct slaved processors in FIG. 4 for clarity of explanation.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

Figure 5:
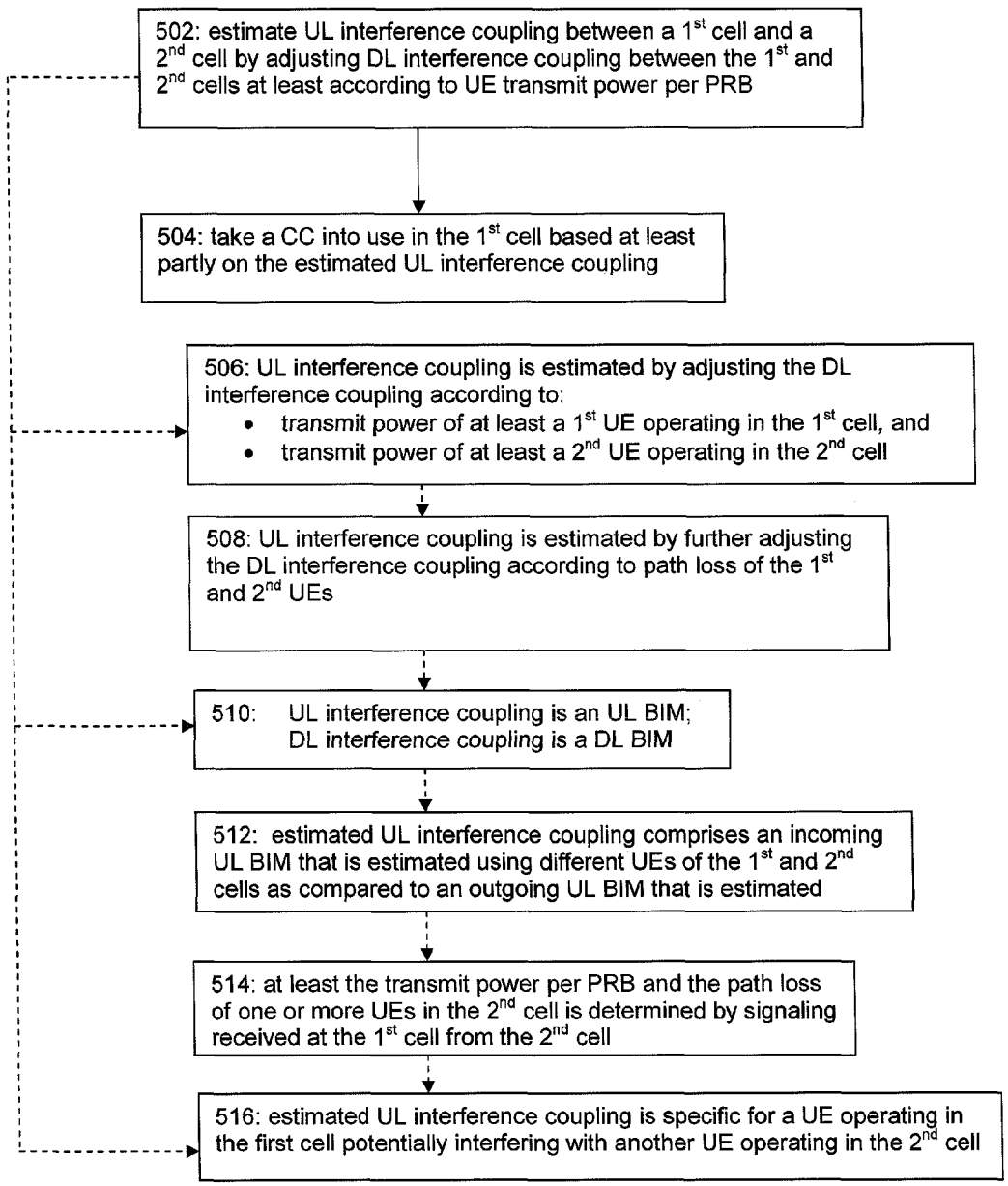
FIG. 5 is a logic flow diagram that illustrates the operation of a method, and a result of execution of computer program instructions embodied on a computer readable memory, in accordance with an exemplary embodiment of this invention.

FIG. 5 is a logic flow diagram that illustrates the operation of a method, and a result of execution of computer program instructions, in accordance with the exemplary embodiments of this invention from the perspective of a network element such as for example the eNB/access node or other base station. In accordance with these exemplary embodiments at block 502 the apparatus or device or network node estimates uplink interference coupling between a first cell and a second cell by adjusting downlink interference coupling between the first and second cells at least according to user equipment transmit power per PRB. At block 504 the decision is made to take a component carrier into use in the first cell based at least partly on the estimated uplink interference coupling.

Additional blocks of FIG. 5 illustrate various specific exemplary but non-limiting embodiments detailed above, and those various blocks may be combined with one another or used individually to modify blocks 502 and/or 504.

Specifically, at block 506 the uplink interference coupling mentioned at block 502 is estimated by adjusting the downlink interference coupling according to transmit power per PRB of at least a first user equipment operating in the first cell and according to transmit power per PRB of at least a second user equipment operating in the second cell. Block 508 further modifies block 506 in that the uplink interference coupling is estimated by further adjusting the downlink interference coupling according to path loss of the first user equipment and of the second user equipment.

Block 510 modifies block 502 in that the uplink interference coupling is an uplink background interference matrix and the downlink interference coupling is a downlink background interference matrix. Block 510 is modified by block 512 in that the estimated uplink interference coupling comprises an incoming uplink background interference matrix and an outgoing uplink background interference matrix, and the estimating of the incoming UL BIM may use different UEs in the first and second cells as compared to the estimating the of the outgoing UL BIM as was noted above by equations (1) and (2) and associated text.

At block 514, there is received signaling from the second cell from which is determined at least the transmit power per PRB of at least one user equipment of block 506 that is in the second cell and the path loss of the at least one user equipment of block 508 that is in the second cell.

At block 516 the estimated uplink interference coupling of block 502 is specific for one particular UE operating in the first cell (not necessarily the first UE) potentially interfering with another UE operating in the second cell (not necessarily the second UE).

The various blocks shown in FIG. 5 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the LTE-Advanced system, it should be appreciated that the exemplary embodiments of this invention are not limited for use with only this one particular type of wireless communication system that uses carrier aggregation.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters and channels are not intended to be limiting in any respect, as these parameters may be identified by any suitable names. Some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. An apparatus comprising:
  a memory storing a program of computer instructions; and
  at least one processor;
  in which the memory and the program of computer instructions is configured with the at least one processor to cause the apparatus to at least:
    estimate uplink interference coupling between a first cell and a second cell by adjusting downlink interference coupling between the first and second cells at least according to user equipment transmit power per physical resource block; and
    decide whether to take a component carrier into use in the first cell based at least partly on the estimated uplink interference coupling.

2. The apparatus according to claim 1, in which the uplink interference coupling is estimated by adjusting the downlink interference coupling according to:
  transmit power per physical resource block of at least a first user equipment operating in the first cell; and
  transmit power per physical resource block of at least a second user equipment operating in the second cell.

3. The apparatus according to claim 2, in which the uplink interference coupling is estimated by further adjusting the downlink interference coupling according to path loss of the at least first user equipment and path loss of the at least second user equipment.

4. The apparatus according to claim 3, in which the transmit power per physical resource block of the at least second user equipment and the path loss of the at least second user equipment is determined from signaling received at the apparatus in the first cell from the at least second user equipment operating in the second cell.

5. The apparatus according to claim 1, in which:
the uplink interference coupling comprises an uplink background interference matrix; and
the downlink interference coupling comprises a downlink background interference matrix.

6. The apparatus according to claim 5, in which
the estimated uplink interference coupling comprises an incoming uplink background interference matrix and an outgoing uplink background interference matrix;
in which the memory and the program of computer instructions is configured with the at least one processor to cause the apparatus to estimate the incoming uplink background interference matrix using different user equipments in the first and second cells as compared to user equipments used to estimate the outgoing uplink background interference matrix.

7. The apparatus according to claim 6, in which the incoming uplink background interference matrix and the outgoing uplink background interference matrix are estimated according to:

$$UL_{\{1\}\leftarrow\{2\}} \approx DL_{\{1\}\rightarrow\{2\}} - PSD_{Interfered\_own\_largest\_PL}(B) + PSD_{Interferer\_other}(C) - \Delta(PL_B, PL_C)$$

$$UL_{\{1\}\rightarrow\{2\}} \approx DL_{\{1\}\leftarrow\{2\}} + PSD_{Interferer}(B) - PSD_{Interfered\_other\_largest\_PL}(D) + \Delta(PL_B, PL_D);$$

in which:
$UL_{\{1\}\leftarrow\{2\}}$ is the estimated incoming uplink background interference matrix;
$DL_{\{1\}\rightarrow\{2\}}$ is an outgoing downlink background interference matrix;
PSD is power spectral density representing user equipment transmit power per physical resource block;
PL is path loss;
$UL_{\{1\}\rightarrow\{2\}}$ is the estimated outgoing uplink background interference matrix;
$D_{\{1\}\leftarrow\{2\}}$ is an incoming downlink background interference matrix;
B represents the first user equipment operating in the first cell; and
C and D represent two user equipments operating in the second cell.

8. The apparatus according to claim 1, in which the apparatus comprises a network access node operating in the first cell.

9. A method comprising:
estimating uplink interference coupling between a first cell and a second cell by adjusting downlink interference coupling between the first and second cells at least according to user equipment transmit power per physical resource block; and
deciding whether to take a component carrier into use in the first cell based at least partly on the estimated uplink interference coupling.

10. The method according to claim 9, in which the uplink interference coupling is estimated by adjusting the downlink interference coupling according to:
transmit power per physical resource block of at least a first user equipment operating in the first cell; and
transmit power per physical resource block of at least a second user equipment operating in the second cell.

11. The method according to claim 10, in which the uplink interference coupling is estimated by further adjusting the downlink interference coupling according to path loss of the at least first user equipment and path loss of the at least second user equipment.

12. The method according to claim 11, in which the transmit power per physical resource block of the at least second user equipment and the path loss of the at least second user equipment is determined from signaling received in the first cell from the at least second user equipment operating in the second cell.

13. The method according to claim 9, in which:
the uplink interference coupling comprises an uplink background interference matrix; and
the downlink interference coupling comprises a downlink background interference matrix.

14. The method according to claim 13, in which the estimated uplink interference coupling comprises an incoming uplink background interference matrix and an outgoing uplink background interference matrix;
in which the incoming uplink background interference matrix is estimated using different user equipments in the first and second cells as compared to user equipments used to estimate the outgoing uplink background interference matrix.

15. The method according to claim 14, in which the incoming uplink background interference matrix and the outgoing uplink background interference matrix are estimated according to:

$$UL_{\{1\}\leftarrow\{2\}} \approx DL_{\{1\}\rightarrow\{2\}} - PSD_{Interfered\_own\_largest\_PL}(B) + PSD_{Interferer\_other}(C) - \Delta(PL_B, PL_C)$$

$$UL_{\{1\}\rightarrow\{2\}} \approx DL_{\{1\}\leftarrow\{2\}} + PSD_{Interferer}(B) - PSD_{Interfered\_other\_largest\_PL}(D) + \Delta(PL_B, PL_D);$$

in which:
$UL_{\{1\}\leftarrow\{2\}}$ is the estimated incoming uplink background interference matrix;
$DL_{\{1\}\rightarrow\{2\}}$ is an outgoing downlink background interference matrix;
PSD is power spectral density representing user equipment transmit power per physical resource block;
PL is path loss;
$UL_{\{1\}\rightarrow\{2\}}$ is the estimated outgoing uplink background interference matrix;
$DL_{\{1\}\leftarrow\{2\}}$ is an incoming downlink background interference matrix;
B represents the first user equipment operating in the first cell; and
C and D represent two user equipments operating in the second cell.

16. The method according to claim 9, in which the estimated uplink interference coupling is specific to one user equipment operating in the first cell such that the decided component carrier has a maximum re-use of one among at least the first and second cells.

17. A memory storing a program of computer instructions that when executed by a processor result in actions directed toward evaluating a component carrier for use, the actions comprising:
estimating uplink interference coupling between a first cell and a second cell by adjusting downlink interference coupling between the first and second cells at least according to user equipment transmit power per physical resource block; and
deciding whether to take a component carrier into use in the first cell based at least partly on the estimated uplink interference coupling.

18. The memory according to claim 17, in which the uplink interference coupling is estimated by adjusting the downlink interference coupling according to:
transmit power per physical resource block of at least a first user equipment operating in the first cell; and
transmit power per physical resource block of at least a second user equipment operating in the second cell.

19. The memory according to claim 18, in which the uplink interference coupling is estimated by further adjusting the downlink interference coupling according to path loss of the at least first user equipment and path loss of the at least second user equipment.

20. The memory according to claim 19, in which the transmit power per physical resource block of the at least second user equipment and the path loss of the at least second user equipment is determined from signaling received in the first cell from the at least second user equipment operating in the second cell.

* * * * *

UNITED STATES PATENT AND TRADEMARK OFFICE
CERTIFICATE OF CORRECTION

| | | |
|---|---|---|
| PATENT NO. | : 8,543,064 B2 | Page 1 of 1 |
| APPLICATION NO. | : 13/036464 | |
| DATED | : September 24, 2013 | |
| INVENTOR(S) | : Klaus I. Pedersen et al. | |

It is certified that error appears in the above-identified patent and that said Letters Patent is hereby corrected as shown below:

IN THE CLAIMS:

In Claim 7: Column 13, line 23, insert --and--;

line 36, delete "D" and replace with --DL--;

In Claim 15: Column 14, line 25, insert --and--.

Signed and Sealed this
Twenty-eighth Day of January, 2014

Michelle K. Lee
*Deputy Director of the United States Patent and Trademark Office*